(12) United States Patent
Mizushima et al.

(10) Patent No.: US 8,047,512 B2
(45) Date of Patent: Nov. 1, 2011

(54) VIBRATION DAMPING APPARATUS

(75) Inventors: Daichi Mizushima, Anjo (JP); Takehiko Fushimi, Kariya (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 1124 days.

(21) Appl. No.: 11/730,904

(22) Filed: Apr. 4, 2007

(65) Prior Publication Data

US 2007/0241489 A1    Oct. 18, 2007

(30) Foreign Application Priority Data

Apr. 14, 2006   (JP) ................. 2006-112113

(51) Int. Cl.
*F16M 1/00* (2006.01)
*F16M 13/00* (2006.01)
*F16F 5/00* (2006.01)

(52) U.S. Cl. .............. 267/140.14; 267/136; 248/562; 248/636

(58) Field of Classification Search ........... 267/140.14, 267/136; 248/560, 562, 566, 559, 638, 636
See application file for complete search history.

(56) References Cited

U.S. PATENT DOCUMENTS

| | | | |
|---|---|---|---|
| 5,769,173 A * | 6/1998 | Egami et al. | 173/114 |
| 6,067,490 A * | 5/2000 | Ichimaru et al. | 701/37 |
| 6,123,312 A * | 9/2000 | Dai | 248/550 |
| 6,671,596 B2 * | 12/2003 | Kawashima et al. | 701/37 |
| 6,920,951 B2 * | 7/2005 | Song et al. | 180/165 |
| 2004/0124332 A1 * | 7/2004 | Takenaka et al. | 248/648 |
| 2004/0232307 A1 | 11/2004 | Nemoto et al. | |
| 2005/0113979 A1 | 5/2005 | Ichikawa | |
| 2005/0248070 A1 | 11/2005 | Ichikawa et al. | |

FOREIGN PATENT DOCUMENTS

| | | |
|---|---|---|
| JP | 2-21044 A | 1/1990 |
| JP | 8-109945 A | 4/1996 |
| JP | 10-274281 A | 10/1998 |
| JP | 2000-20139 A | 1/2000 |
| JP | 2000-262032 A | 9/2000 |
| JP | 2001-108014 A | 4/2001 |
| JP | 2001-311452 A | 11/2001 |
| JP | 3402120 B2 | 2/2003 |
| JP | 2003-309961 A | 10/2003 |
| JP | 2004-262389 A | 9/2004 |
| JP | 2005-155664 A | 6/2005 |
| JP | 2005-299832 A | 10/2005 |

OTHER PUBLICATIONS

Japanese Office Action issued in Japanese Application No. 2006-112113 dated Oct. 14, 2010.

* cited by examiner

*Primary Examiner* — Bradley King
*Assistant Examiner* — Vishal Sahni
(74) *Attorney, Agent, or Firm* — Sughrue Mion, PLLC (57) ABSTRACT

A vibration damping apparatus actively damping vibration of a vibration source by adding vibration to the vibration source includes a vibrational state detecting means and a vibrator including a magnetic pole, a coil, and a controlling means, and the vibrator adds vibration to the vibration source by controlling a current-supplied state of the coil to vibrate the coil and the magnetic pole relatively, wherein the controlling means selectively switches a vibration generating mode and a regenerative mode based on the vibrational state of the vibration source, the vibration is added to the vibration source to damp the vibration of the vibration source in the vibration generating mode, and regenerative current is caused by an electro motive force generated at the coil by the vibration of the vibration source to flow into a regenerative resistor in the regenerative mode.

4 Claims, 5 Drawing Sheets

VIBRATION DAMPING APPARATUS

CROSS REFERENCE TO RELATED APPLICATIONS

This application is based on and claims priority under 35 U.S.C §119 with respect to Japanese Patent Application 2006-112113, filed on Apr. 14, 2006, the entire content of which is incorporated herein by reference.

FIELD OF THE INVENTION

This invention relates to a vibration damping apparatus actively damping vibration of a vibration source by generating another vibration to the vibration source.

BACKGROUND

When a structure vibrates, for example, machinery or a building having an engine or a motor vibrates, a vibration damping apparatus damps vibration by adding anti-phase vibration of the vibration. For example, the vibration damping apparatus disclosed in JP 2005-299832A adds anti-phase vibration of the vibration generated in an engine serving as a vibration source by use of an electromagnetic actuator. Further, the vibration damping apparatus is designed to carry out damping depending on an operation state of the engine. That is, the vibration damping apparatus drives the electromagnetic actuator based on signals, and the signals are derived from different methods which are selectively changed between the damping for low frequency vibration and the damping for high frequency vibration. More specifically, the low frequency vibration occurs when the vehicle provided with the engine is in an idle state and the high frequency vibration occurs when the vehicle is in a running state.

The vibration source such as an engine is mounted on a fixed end. For example, the vibration source is fixed to a vehicle body. Thus, a vibration system which is composed of the fixed end and the vibration source has a resonance frequency. When the vibration source vibrates at the resonance frequency or at similar frequencies, the vibration is amplified and the amplitude becomes larger. The resonance frequency changes depending on how the vibration source is connected to the fixed end (for example, the connection via springs) or mass of the vibration source. Thus, as disclosed in JP 2005-299832A, it is not possible to deal with the resonating vibration system by merely changing the control between the idle state and the running state.

If the electromagnetic actuator which generates an anti-phase vibration generating force is sized up, then it is possible to obtain output power enough to damp the amplitude of the vibration system in a resonant state. However, in that case, the cost of the apparatus increases and it would be difficult to secure a space to dispose the apparatus due to size increase of the vibration damping apparatus provided with the electromagnetic actuator. Further, if the size of the vibration damping apparatus is increased, it is not possible to adequately utilize the ability of the vibration damping apparatus when the vibration source vibrates at the frequency other than the resonance frequency and thus the amplitude of the vibration system is small.

On the other hand, the size of the vibration damping apparatus remains small, when the vibration source vibrates at the frequency other than the resonate frequency, it is possible to carry out the effective damping taking full advantage of the ability of the apparatus. However, when the vibrating source vibrates at the resonance frequency, even though the apparatus attempts to carry out the damping, it is not possible to carry out the damping effectively due to large amplitude caused by the resonance leading to loss of electric energy required for attempting the damping.

The present invention has been made in view of the above circumstances, and provides a vibration damping apparatus which is able to carry out the effective damping without the loss of the energy therefore.

SUMMARY OF THE INVENTION

According to an aspect of the present invention, a vibration damping apparatus actively damping vibration of a vibration source by adding vibration to the vibration source includes a vibrational state detecting means for detecting a vibrational state of the vibration source, and a vibrator including a magnetic pole, a coil provided so as to intercept magnetic flux formed by the magnetic pole, and a controlling means electrically connected to the coil, the vibrator adding vibration to the vibration source by controlling a current-supplied state of the coil to vibrate the coil and the magnetic pole relatively, wherein the controlling means selectively switches a vibration generating mode and a regenerative mode based on the vibrational state of the vibration source, the vibration is added to the vibration source to damp the vibration of the vibration source in the vibration generating mode, and regenerative current is caused by an electro motive force generated at the coil by the vibration of the vibration source to flow into a regenerative resistor in the regenerative mode.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
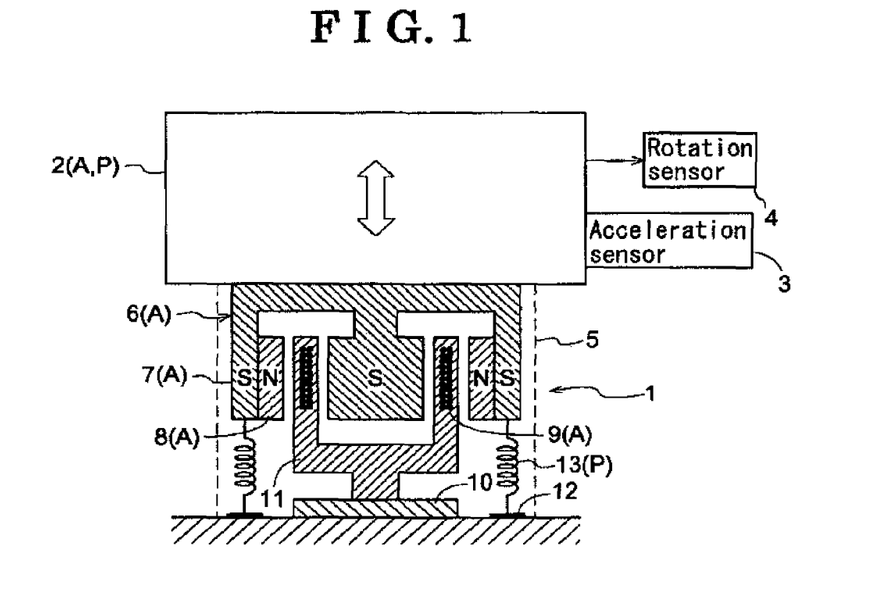
FIG. 1 is a schematic view illustrating a structure of a vibration damping apparatus.
Figure 2A:
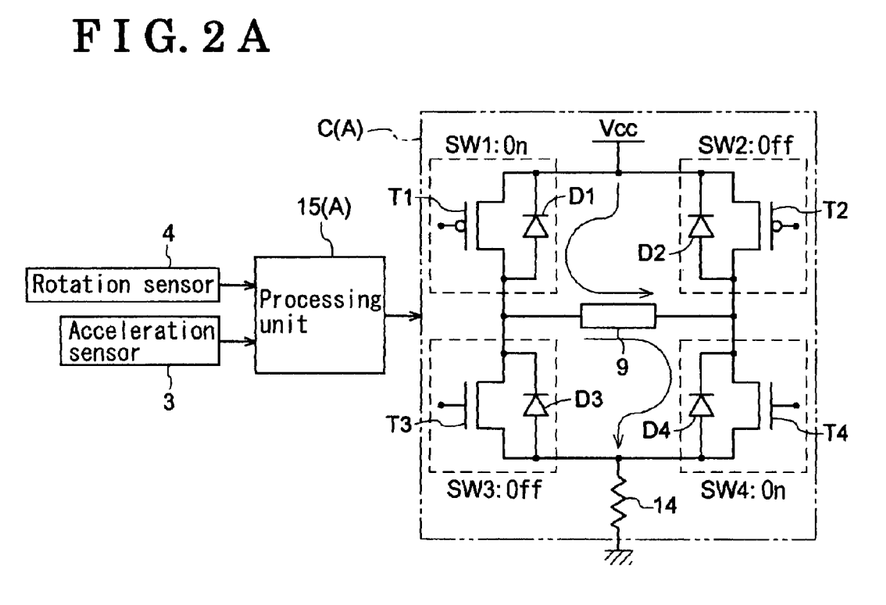
FIGS. 2A and 2B are schematic electrical circuit diagrams of a control circuit in the vibration damping apparatus.
Figure 2B:
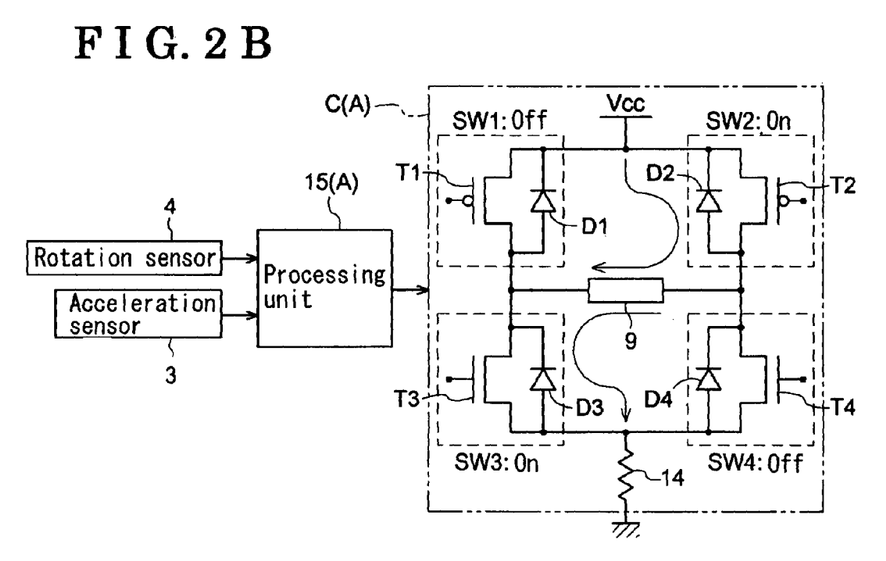
Figure 3A:
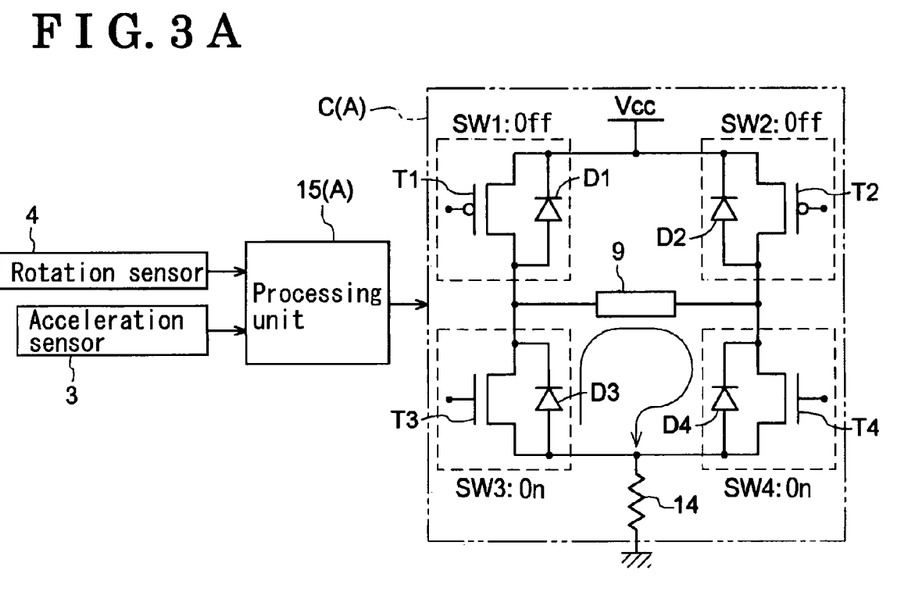
FIGS. 3A and 3B are schematic electrical circuit diagrams of a control circuit in the vibration damping apparatus.
Figure 3B:
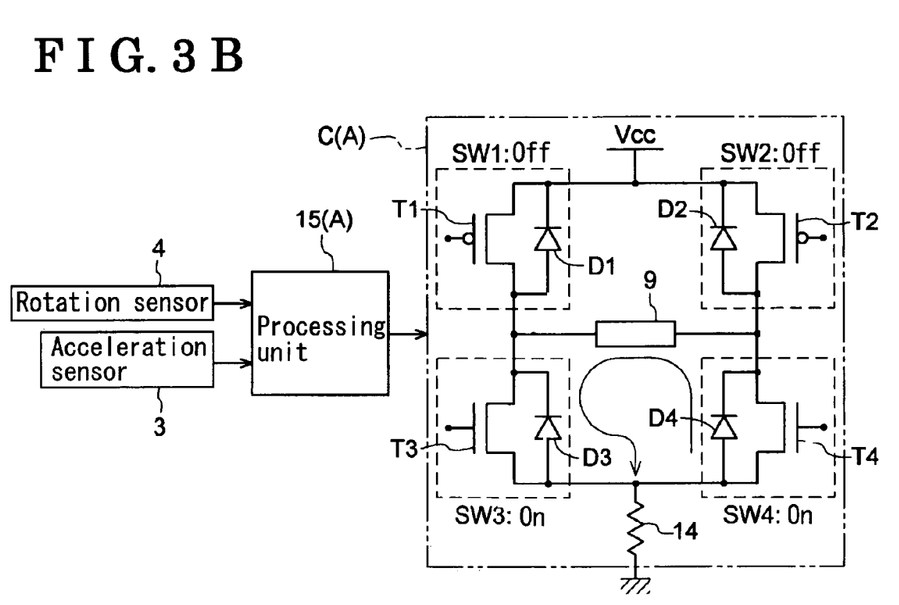

A vibration damping apparatus according to an embodiment of the present invention will be described below with reference to the attached drawings hereinafter. FIG. 1 is a schematic view illustrating a structure of a vibration damping apparatus 1 and FIGS. 2 and 3 are schematic electrical circuit diagrams of a control circuit C of a vibrator 5 in the vibration damping apparatus 1. The vibration damping apparatus 1 according to the embodiment of the present invention includes the vibrator 5. The vibrator 5 adds anti-phase vibration to an engine 2 serving as a vibration source and thereby actively damps the vibration of the engine 2. The vibrator 5 includes a magnetic pole 6, a coil 9, and the control circuit C. The coil 9 is provided so as to intercept magnetic flux formed by the magnetic pole 6 and the control circuit C has the coil 9. Also, the control circuit C is connected to a processing unit 15 which controls to turn on/off below-described switches SW1, SW2, SW3 and SW4. The processing unit 15 serving as a controlling means is electrically connected to the coil 9 and performs processing for actively damping the vibration of the engine 2.

The magnetic pole 6 is a permanent magnet. One end of the magnetic pole 6 is connected to the engine 2 and the other end of the magnetic pole 6 is fixed to a fixed end 12 by springs 13 serving as elastic members. For example, a vehicle body may be fixed to a vehicle body. Hence, the springs 13 extend and contract in response to the vibration of the engine 2 and the vibration is damped. That is, in the vibration damping apparatus 1 shown in FIG. 1, a passive vibration system P is composed of the engine 2 and the springs 13. However, a vibration frequency of the engine 2 becomes similar to a resonance frequency of the passive vibration system P, resonance occurs in the passive vibration system P, may result in the large vibration of the engine 2.

The magnetic pole 6 is provided with a south pole 7 and north poles 8, and the coil 9 is movably fitted into a cylindrical space between the south pole 7 and the north poles 8. The coil 9 is held by a cylindrical coil holding member 11 and the coil holding member 11 is fixed to a supporting member 10 provided at the fixed end 12 such as the vehicle body and the likes. Thus, it is possible to add the vibration to the magnetic pole 6 with a magnetic field formed by supplying electric current to the coil 9. Moreover, the magnetic flux which is intercepted by the coil 9, changes in response to the vibration of the magnetic pole 6, and thus an electro motive force is generated in the coil 9.

As described above, in the vibration damping apparatus 1 of the embodiment of the present invention, when the engine 2 vibrates, the vibration damping apparatus 1 damps the vibration by the passive vibration system P which is composed of the engine 2 and the springs 13. Alternatively, the vibration damping apparatus 1 damps the vibration by an active vibration system A which is composed of the engine 2, the magnetic pole 6, the control circuit C having the coil 9 and the processing unit 15.

As illustrated in FIGS. 2 and 3, the control circuit C is composed of an H-bridge circuit. The H-bridge circuit is composed of four switches SW1 to SW4, the coil 9, a power supply Vcc and a resistor 14. In the H-bridge circuit, the switch SW1 and the switch SW3, and the switch SW2 and the switch SW4 are connected in series respectively. These two series circuits are connected to each other in parallel between the power supply Vcc and the resistor 14 as well as ground, the connecting point between the switch SW1 and the switch SW3 is connected to the connecting point between the switch SW2 and the switch SW4 via the aforementioned coil 9.

The respective switches SW1 to SW4 are composed by transistors T1, T2, T3 and T4 and Diodes D1, D2, D3 and D4. Specifically, the switch SW1 is composed of the transistor T1 and the diode D1, the switch SW2 is composed of the transistor T2 and the diode D2, the switch SW3 is composed of the transistor T3 and the diode D3, and the switch SW4 is composed of the transistor T4 and the diode D4. The switch SW1 and the switch SW2 are located at a power supply Vcc side (positive pole side) and the switches SW1 and SW2 are called high side switches. The switch SW3 and the switch SW4 are located at a ground side (negative pole side) and the switches SW3 and SW4 are called low side switches.

FIGS. 2A and 2B schematically illustrates the states of the respective switches and the current when the vibrations are added to the engine 2 by the vibrator 5. FIG. 3 schematically illustrates the states of the current when the vibration of the engine 2 is regenerated without adding the vibration by the vibrator 5.

FIG. 2A illustrates the state that the switch SW1 of the high side switch and the switch SW4 of the low side switch are on and the switch SW2 of the high side switch and the switch SW3 of the low side switch are off. Therefore, the current flows into the coil 9 in a direction of an arrow shown in the figure. Thus, the vibration is added to the magnetic pole 6 by the magnetic field which is generated by the coil 9.

Also, FIG. 2B illustrates the state that the switch SW2 of the high side switch and the switch SW3 of the low side switch are on and the switch SW1 of the high side switch and the switch SW4 of the low side switch are off. Thus, the current flows into the coil 9 in an opposite direction from the case shown in FIG. 2A, and thus the vibration is added to the magnetic pole 6 in the opposite direction from the case shown in FIG. 2A. As described above, the processing unit 15 controls the direction of the current supplied to the coils 9 and the likes by switching on/off states of the respective switches SW1 to SW4 included in the control circuit C and thereby performs the vibration generating mode controlling amplitude and a phase of a vibration generating force against the magnetic pole 6 and the engine 2.

FIGS. 3A and 3B illustrates the state that the switch SW1 and the switch SW2 of the high side switch are off and the switch SW3 and the switch SW4 of the low side switch are on. Consequently, the power supply Vcc is not connected to the coil 9, and the electrical energy is not supplied to the control circuit C when the engine 2 and the magnetic pole 6 do not vibrate. However, once the engine 2 and the magnetic pole 6 vibrate, the magnetic flux which is intercepted by the coil 9 changes, and thus the electro motive force is generated in the coil 9 and the regenerative current caused by the electro motive force flows into the coil 9.

FIG. 3A illustrates the state that the regenerative current, which flows from the left side to the right side of the figure in the coil 9, flows out to the ground through the resistor 14. FIG. 3B illustrates the state that the current, which flows from the right side to the left side of the figure in the coil 9, flows out to the ground through the resistor 14. That is, the resistor 14 functions as a regenerative resistor and transforms the regenerative current from electric energy to thermal energy (Joule heat). The direction of the current supplied to the coil 9 varies depending on vibration directions of the engine 2 and the magnetic pole 6. As described above, the processing unit 15 switches the on/off states of the respective switches SW1 to SW4 included in the control circuit C and thereby controls the direction of the regenerative current supplied to the coil 9, which is caused by the vibration of the engine 2 to perform the regenerative mode in which the regenerative current generated in the coil 9 is flowed into the resistor 14 (regenerative resistor).

Figure 4A:
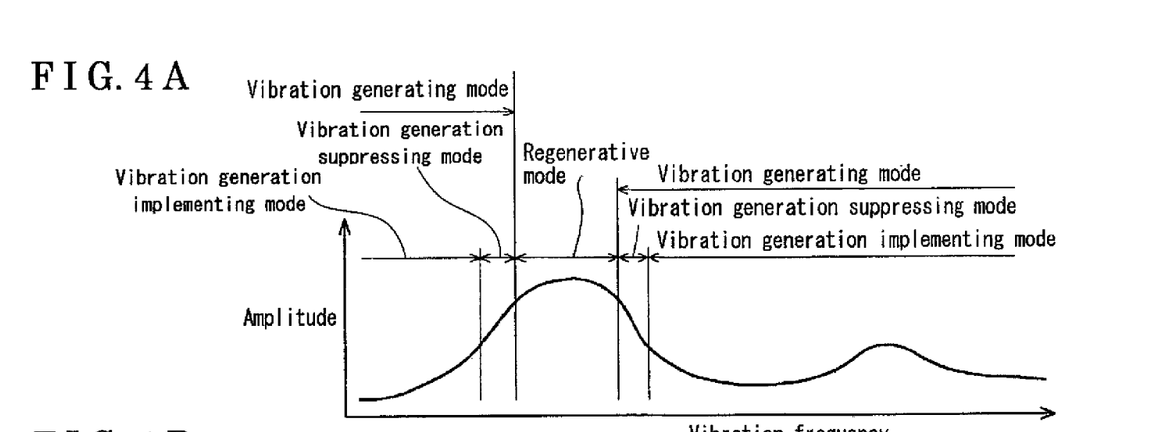
FIG. 4A is a graph illustrating a relationship between a vibration frequency and amplitude of vibration and FIG. 4B is a graph illustrating a relationship between a number of revolutions and the amplitude of the vibration.
Figure 4B:
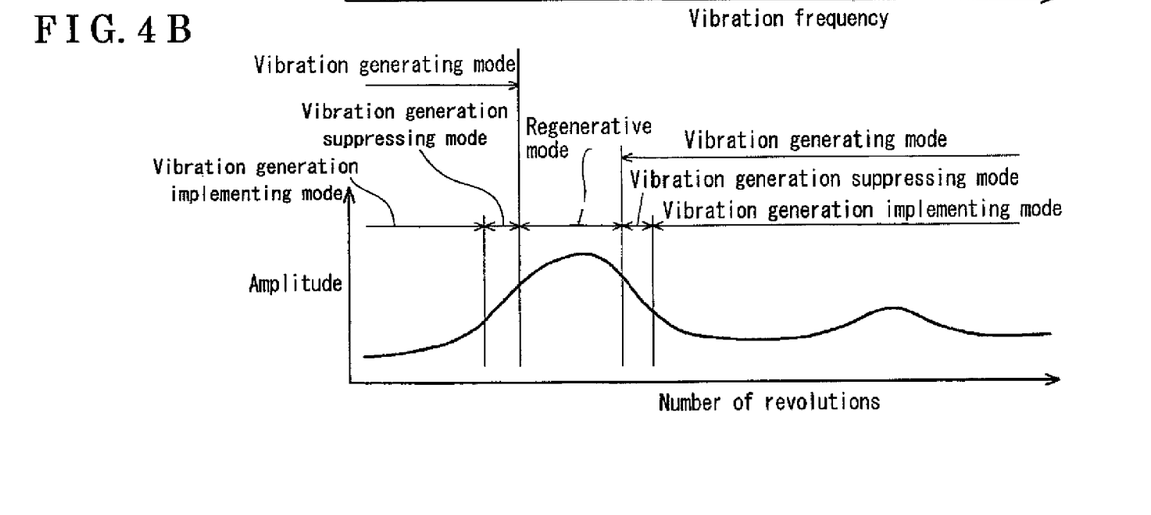

Next, the vibration generating mode will be described with reference to FIGS. 4 and 5. FIG. 4A is a graph illustrating a relationship between the vibration frequency and the amplitude of the vibration when the engine vibrates. The engine 2 is structured so as to be supported by the springs 13 and the vibration of the engine 2 is caused by expansions and contractions of the springs 13. Therefore, the vibration frequency that has the maximum amplitude is the resonance frequency which is unique to the passive vibration system P having the engine 2 and the springs 13. Thus, when the vibration frequency of the engine 2 is in a setting range (the resonance frequency and the similar frequencies), it would be difficult to completely damp the vibration without a large-size vibration damping apparatus.

The processing unit 15 of the vibration damping apparatus 1 according to the embodiment of the present invention is structured so as to selectively switch the vibration generating mode and the regenerative mode based on the vibrational state of the engine 2. The processing unit 15 determines the vibrational state of the engine 2 based on a detection result of a rotation sensor 4 which is mounted on the engine 2. The engine 2 is a rotation machine and vibrates depending on a number of revolutions. Consequently, the vibration frequency occurs in the passive vibration system P depending on a number of the revolutions. Therefore, the detected number of the revolutions is preliminarily related to the vibration frequency, which is predicted based on the number of the revolutions, and thus the processing unit 15 can store the relationship between the number of revolutions and the amplitude of the vibration, which is shown in FIG. 4B. Then, the processing unit 15 is structured so as to switch from the vibration generating mode to the regenerative mode when the number of the revolutions is in a setting range. (a predetermined number of revolutions and similar numbers of revolutions)

Alternatively, the vibrational state of the engine 2 may be detected by an acceleration sensor 3 serving as a vibrational state detecting means. The acceleration sensor 3, which is provided at the engine 2, detects vibration acceleration of the engine 2. Thus, variable frequency indicative of variations of the vibration acceleration is equal to the vibration frequency of the engine 2. Accordingly, the processing unit 15 is structured so as to switch the vibration generating mode to the regenerative mode when the variable frequency of the vibration acceleration detected by the acceleration sensor 3 is in a setting range (a predetermined frequency or the similar frequencies).

As described above, after the processing unit 15 switches the operation mode so that the vibration damping apparatus 1 is operated in the regenerative mode, the vibrator 5 does not add the vibration. Instead, the regenerative current caused by the electro motive force generated in the coil 9 is consumed at the resistor 14. While performing the regenerative mode, the vibration of the engine 2 (kinetic energy) is transformed to the regenerative current (electric energy) at the magnetic pole 6 and the coil 9 in the controlling circuit C of the vibration damping apparatus 1 and the electric energy is consumed at the resistor 14 serving as the regenerative resistance. The energy is consumed in the form of Joule heat (thermal energy). That is, the vibration of the vibration source is damped even in the regenerative mode.

Further, the vibration generating mode includes a vibration generation suppressing mode and a vibration generation implementing mode. The vibration generation suppressing mode is operated when the vibrational state of the engine 2 is in a boundary range which is around the setting range. The processing unit 15 conducts first PWM control in the vibration generation implementing mode and conducts second PWM control in the vibration generation suppressing mode. In the first PWM control, a time period for supplying the current to the coil 9 is set in accordance with a first relationship in which the time period for supplying the current to the coil 9 becomes longer as the vibration of the engine 2 based on the detection result of the rotation sensor 4 (or the acceleration sensor 3) becomes larger. In the second PWM control, the time period for supplying the current to the coil 9 is set so as to be shorter than the time period for supplying the current to the coil 9 which is derived from the first relationship.

As described above, the processing unit 15 conducts PWM control not so-called PAM control. In the PAM control, the current supplied to the coil 9 becomes larger as the vibration of the engine 2 becomes larger. On the other hand, the time period for supplying current to the coil 9 becomes longer with the current supplied to the coil 9 being constant in the PWM control. Thus, only the above-described switches SW1 to SW4, which is for supplying the current to the coil 9, are required and a mechanism is not required for enabling the current supplied to the coil 9 to be variable. The above-described first relationship between the number of revolutions of the engine 2 and the time period for supplying the current to the coil 9 may be preliminarily stored in the memory which is included in the processing unit 15. The relationship may be stored in the form of a map. Further, the vibration is not adequately damped in the regenerative mode. For this reason, when the control is switched from the vibration generating mode to the regenerative mode directly, the vibration may suddenly appear in the regenerative mode. However, the processing unit 15 operates the vibration generation suppressing mode when the control is conducted in the vibration generating mode and the vibrational state of the engine 2 is in the boundary range, which is around the above-described setting range. In the vibration generation suppressing mode, the second PWM control is conducted. In the second PWM control, the time period for supplying the current to the coil 9 is set so as to be shorter than the time period for supplying the current to the coil 9 which is derived from the first relationship. That is, the damping for the vibration of the engine 2 is deliberately weakened in the vibration generation suppressing mode so that the vibration appears. Thus, when the vibration generating mode is switched to the regenerative mode, the vibration appears transiently not suddenly.

Figures 5A, 5B:
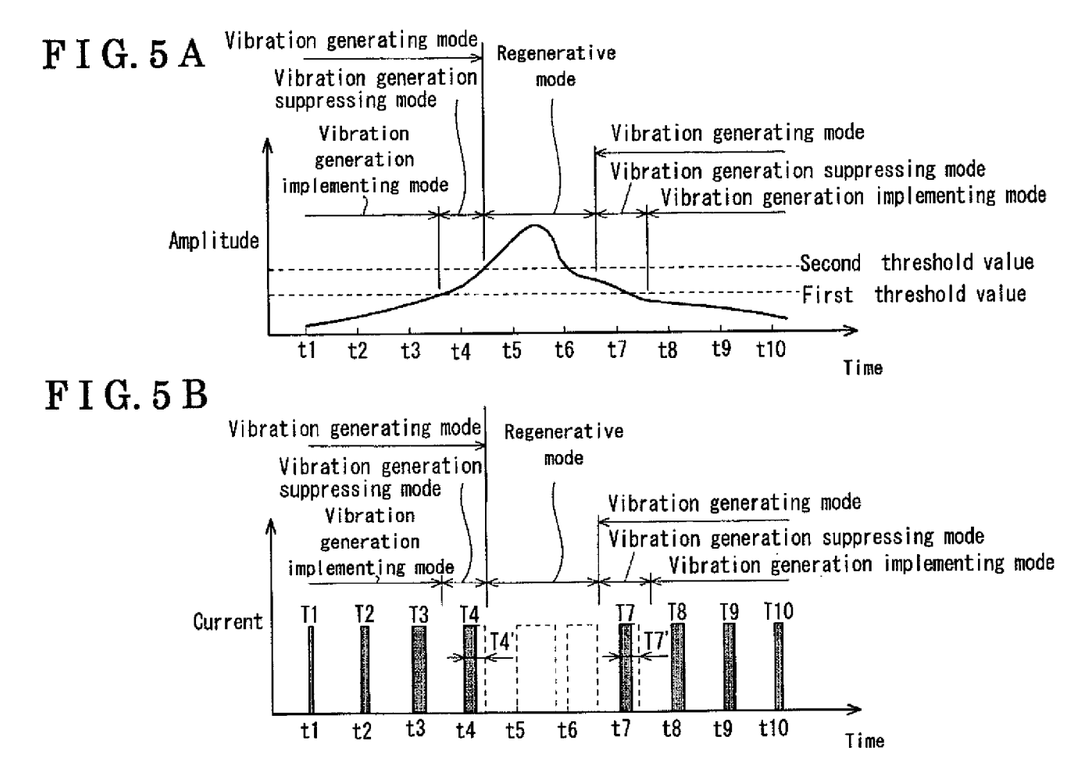
FIG. 5A is a graph illustrating temporal variations of the amplitude of the vibration and FIG. 5B is a graph illustrating temporal variations of current supplied to a coil.

FIG. 5 is a view illustrating operation of the vibration damping apparatus 1 when the vibration of the engine 2 changes over time. Specifically, FIG. 5A is a graph showing temporal variations of the amplitude of the vibration of the engine 2 and FIG. 5B shows a pattern of temporal variations of the amount of the current supplied to the coil 9. At that time, it is possible to derive the amplitude of the vibration of the engine 2 from the above-described rotation sensor 4 (or the acceleration sensor 3). As illustrated in FIGS. 5A and 5B, the amplitude of the vibration is small at a time t1 and thus the time period for supplying the current to the coil 9 is short. The amplitude of the vibration becomes larger as time elapses from a time t2 to a time t3 and the time period for supplying the current to the coil 9 becomes longer depending on the amplitude. However, the current value is constant.

The amplitude of the vibration becomes larger at a time t4 and exceeds a first threshold value, then the processing unit 15 determines that the vibrational state exists in the above-mentioned boundary range and switches the vibration generation implementing mode in which the first PWM control is conducted to the vibration generation suppressing mode in which the second PWM control is conducted to add the vibration to the engine 2. The current is supplied to the coil 9 for a time period T4 at a time t4. If the first PWM control is conducted at the time t4, the time period for supplying the current to the coil 9 at the time t4 is T4' (>T4). Thus, the vibration generating force in the second PWM control is smaller than that in the first PWM control. That is, when the vibration is added to the engine 2 under the second PWM control, the vibration of the engine 2 is not completely damped.

The amplitude of the vibration becomes larger at a time t5 and exceeds the second threshold value, and then the processing unit 15 determines that the vibrational state of the engine 2 exists in the above-described setting range. The processing unit 15 subsequently switches the vibration generating mode to the regenerative mode. At that time, the vibrator 5 does not generate the vibration and the processing unit 15 consumes the regenerative current, which is caused by the electro motive force generated in the coil 9 by the vibration of the engine 2, at the resistor 14. Therefore, as illustrated in FIG. 5B, the amount of the current supplied to the coil 9 is zero at the time T5 and T6 when the amplitude of the vibration exceeds the second threshold value.

The amplitude of the vibration becomes smaller at a time t7 and falls below the second threshold value. The processing unit 15 determines that the vibration of the engine 2 exists in the boundary range and switches the regenerative mode to the vibration generation suppressing mode to add the vibration to the engine 2 under the second PWM control. The current is supplied to the coil 9 for a time period T7 at a time t7. If the first PWM control is conducted at the time t7, the time period for supplying the current to the coil 9 at the time t7 is T7' (>T7). Thus, the vibration generating force in the second PWM control is smaller than that in the first PWM control. That is, when the vibration is added to the engine 2 under the second PWM control, the vibration of the engine 2 is not completely damped.

Thereafter, the amplitude of the vibration becomes smaller as the time elapses from a time t8 to a time t10. When the amplitude of the vibration falls below the first threshold value, the processing unit 15 switches to the vibration generation implementing mode to add the vibration to the engine 2 under the first PWM control.

Another Embodiment

In the above embodiment, the coil 9 is connected to the supporting member 10 and the magnetic pole 6 is connected to the engine 2. However, the apparatus may be configured so that the coil 9 is connected to at a side of the engine 2 and the magnetic pole 6 is connected to at a side of the supporting member 10.

According to the above-described structure, the controlling means determines if it is proper to damp the vibrational state of the vibration source by adding the vibration. When it is proper, the controlling means performs the vibration generating mode. When it is not proper, the controlling means performs the regenerative mode instead of the vibration generating mode. In other words, when the vibration is effectively damped by adding the vibration to the vibration source, the damping is carried out by supplying the electric energy to the coil. When the vibration is not effectively damped by adding the vibration to the vibration source, the electric energy is not supplied to the coil to restrain the loss of the energy. Further, the vibration damping apparatus transforms the vibration of the vibration source to the regenerative current (electric energy) and consumes the electric energy in the form of Joule heat (heat energy) at the regenerative resistor. That is, the vibration of the vibration source is damped even in the regenerative mode. Therefore, it is possible to provide a vibration damping apparatus which enables the effective damping without the loss of the energy required for the damping.

According to the above-described structure, the vibrational state of the vibration source, which is the rotation machine, is determined by detecting the number of the revolutions. Thus, it is not necessary to use an expensive acceleration sensor for the detection of the vibrational state of the vibration source, resulting in an inexpensive vibration damping apparatus.

According to the above-described structure, the vibrational state of the vibration source is determined based on vibration acceleration of the vibration source. Therefore, it is possible to detect the vibrational state more accurately.

According to the above-described structure, the first PWM control is conducted, not the PAM control. In the PAM control, the current supplied to the coil becomes larger as the vibration of the vibration source becomes larger. On the other hand, the time period for supplying the current to the coil becomes longer with the current supplied to the coil 9 being constant in the first PWM control. Thus, only the above-described switches SW1 to SW4, which is for supplying the current, are required, and the mechanism is not required to enable the current supplied to the coil to be variable. Hence, it is possible to construct the vibration damping apparatus with a simple structure. Further, the vibration is not damped completely in the regenerative mode, which is performed when the vibrational state of the vibration source is in the setting range. Thus, if the control is switched from the vibration generating mode to the regenerative mode directly, the vibration may suddenly occur in the regenerative mode. However, the processing unit 15 performs the vibration generation suppressing mode, which conducts the second PWM control, when the vibration generating mode is performed and the vibrational state of the engine 2 is in the boundary range, which is around the above-described setting range. In the second PWM control, the time period for supplying the current to the coil is set so as to be shorter than the time period for supplying current to the coil which is derived from the first relationship. That is, the damping for the vibration of the vibration source is deliberately weakened in the vibration generation suppressing mode so that the vibration appears. Thus, when the vibration generating mode is switched to the regenerative mode, the vibration appear transiently not suddenly.

The principles, of the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A vibration damping apparatus actively damping vibration of a vibration source by adding vibration to the vibration source, comprising:
   a vibrational state detecting means for detecting a vibrational state of the vibration source; and
   a vibrator including:
      a magnetic pole;
      a coil provided so as to intercept magnetic flux formed by the magnetic pole; and
      a controlling means electrically connected to the coil, the vibrator adding vibration to the vibration source by controlling a current-supplied state of the coil to vibrate the coil and the magnetic pole relative to one another,
   wherein the controlling means selectively switches between a vibration generating mode and a regenerative mode based on the vibrational state of the vibration source, the vibration is added to the vibration source to damp the vibration of the vibration source in the vibration generating mode, and regenerative current is caused by an electro motive force generated at the coil by the vibration of the vibration source to flow into a regenerative resistor in the regenerative mode, the regenerative resistor being electrically connected to the controlling means;

wherein the vibration source has a rotation machine, the vibrational state detecting means detects a number of revolutions of the rotation machine as the vibrational state, the controlling means switches to the regenerative mode when the number of the revolutions is in a predetermined set range;

wherein the vibration generating mode has a vibration generation suppressing mode and a vibration generation implementing mode, the vibration generation suppressing mode is performed when the number of revolutions is in a first boundary range and in a second boundary range, the first boundary range extends upward from an upper boundary of the predetermined set range and the second boundary range extends downward from a lower boundary of the predetermined set range, the vibration generation implementing mode is performed when the number of revolutions is in a first implementing range and in a second implementing range, the first implementing range extends upward from an upper boundary of the first boundary range and the second implementing range extends downward from a lower boundary of the second boundary range, the controlling means conducts first PWM control in the vibration generation implementing mode and conducts second PWM control in the vibration generation suppressing mode, the first PWM control sets a time period for supplying the current to the coil in accordance with a first relationship in which the time period for supplying the current to the coil becomes longer as the vibration of the vibration source based on a detection result of the vibrational state detecting means becomes larger, and the second PWM control sets the time period for supplying the current to the coil so as to be shorter than the time period for supplying the current to the coil derived from the first relationship.

2. A vibration damping apparatus actively damping vibration of a vibration source by adding vibration to the vibration source, comprising:
a vibrational state detecting means for detecting a vibrational state of the vibration source; and
a vibrator including:
  a magnetic pole;
  a coil provided so as to intercept magnetic flux formed by the magnetic pole; and
  a controlling means electrically connected to the coil, the vibrator adding vibration to the vibration source by controlling a current-supplied state of the coil to vibrate the coil and the magnetic pole relative to one another,
wherein the controlling means selectively switches between a vibration generating mode and a regenerative mode based on the vibrational state of the vibration source, the vibration is added to the vibration source to damp the vibration of the vibration source in the vibration generating mode, and regenerative current is caused by an electro motive force generated at the coil by the vibration of the vibration source to flow into a regenerative resistor in the regenerative mode, the regenerative resistor being electrically connected to the controlling means;

wherein the vibrational state detecting means detects vibration acceleration of the vibration source as the vibrational state, the controlling means switches to the regenerative mode when a variable frequency of the vibration acceleration is in a predetermined set range;

wherein the vibration generating mode has a vibration generation suppressing mode and a vibration generation implementing mode, the vibration generation suppressing mode is operated when the variable frequency of the vibration acceleration is in a first boundary range and in a second boundary range, the first boundary range extends upward from an upper boundary of the predetermined set range and the second boundary range extends downward from a lower boundary of the predetermined set range, the vibration generation implementing mode is performed when the variable frequency of the vibration acceleration is in a first implementing range and in a second implementing range, the first implementing range extends upward from an upper boundary of the first boundary range and the second implementing range extends downward from a lower boundary of the second boundary range, the controlling means performs a first PWM control in the vibration generation implementing mode and performs a second PWM control in the vibration generation suppressing mode, the first PWM control sets a time period for supplying the current to the coil in accordance with a first relationship in which the time period for supplying the current to the coil becomes longer as the vibration of the vibration source based on a detection result of the vibrational state detecting means becomes larger, and the second PWM control sets the time period for supplying the current to the coil so as to be shorter than the time period for supplying the current to the coil derived from the first relationship.

3. A vibration damping apparatus according to claim 1, wherein the predetermined set range is set based on a resonance frequency of the vibration source.

4. A vibration damping apparatus according to claim 2, wherein the predetermined set range is set based on a resonance frequency of the vibration source.

* * * * *